INVENTORS
CHARLES T. MORROW
ROLAND E. BARNABY
LLOYD A. NEVALA
BY
Herbert H. Thompson
ATTORNEY.

July 13, 1954  C. T. MORROW ET AL  2,683,596
RATE OF TURN INSTRUMENT

Filed July 11, 1950  3 Sheets-Sheet 3

INVENTORS
CHARLES T. MORROW
ROLAND E. BARNABY
BY LLOYD A. NEVALA
Herbert H. Thompson
ATTORNEY Patented July 13, 1954

2,683,596

UNITED STATES PATENT OFFICE 2,683,596

RATE OF TURN INSTRUMENT

Charles T. Morrow, Great Neck, Roland E. Barnaby, Hicksville, and Lloyd A. Nevala, Lake Ronkonkoma, N. Y., assignors to The Sperry Corporation, a corporation of Delaware Application July 11, 1950, Serial No. 173,112

18 Claims. (Cl. 264—1)

1

The present invention relates to apparatus for indicating and measuring the angular rate of change of orientation of a body to which it is fixed, and is particularly adaptable for indicating and measuring the angular rate and direction of change of orientation of a movable craft.

The invention relates generally to the class of apparatus described in U. S. application Serial No. 622,739, filed October 17, 1945 in the name of Joseph Lyman, now Patent No. 2,513,340, wherein is disclosed an electrically oscillated tuning fork connected by a torsional constraining spring to a base adapted to be mounted on a craft whose rate of rotation or rate of change of orientation is to be measured, and in which pick-off means are provided for producing an electrical signal corresponding to the magnitude and direction of alternating torsional displacement between the tuning fork and the base or craft upon which the apparatus is mounted.

The present invention is directed specifically to the structural characteristics of such an apparatus and has for its principal object to provide apparatus characterized by extreme ruggedness, low noise level, fast response time, and good long-term stability for measuring the rate of change of orientation of a craft.

Another object of the present invention is to provide a rate of turn indicating and measuring apparatus of the above character in which spurious vibrations of the fork assembly parallel to the turn axis are reduced substantially to zero.

Another object is to provide an apparatus of the above character wherein spurious, reed-like, lateral or translational vibrations of the tuning fork assembly caused by mass unbalance of the tines or vibrations produced therein from some external source are greatly reduced or substantially eliminated.

Still another object of the present invention is to provide an apparatus of the above character in which the tine drive assembly may be adjusted to cause the tines to be vibrated or driven in a plane substantially coincident with the natural plane of vibration of the tines.

A further object of the present invention is to provide apparatus of the above character in which the torsion pick-off devices may be adjusted so as to eliminate sensitivity to some spurious vibrations generated by mass unbalance, coercion in the drive means, and external vibrations.

A still further object of the present invention is to provide apparatus in which the torsional vibrations generated by turning movements of

2 the craft on which it is mounted are damped or quickly suppressed upon completion of the said turning movements.

Other objects and features of the present invention will become apparent in the following detailed description thereof when read in the light of the accompanying drawings in which I have illustrated a preferred embodiment of the present invention, and in which.

Figure 1:
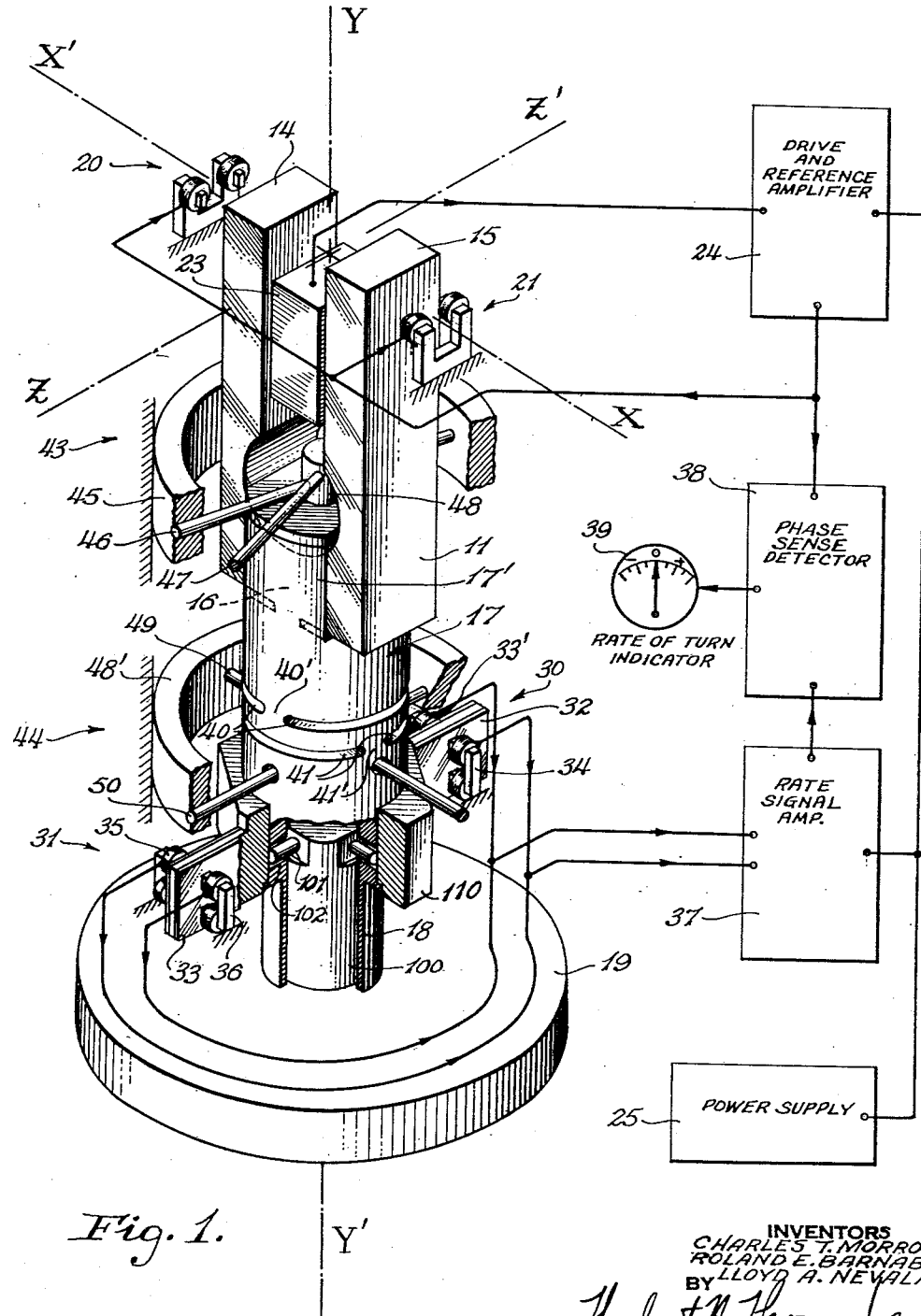
Fig. 1 is a schematic perspective view of the apparatus of my invention partially broken away to show the internal elements thereof.
Figures 2, 3:
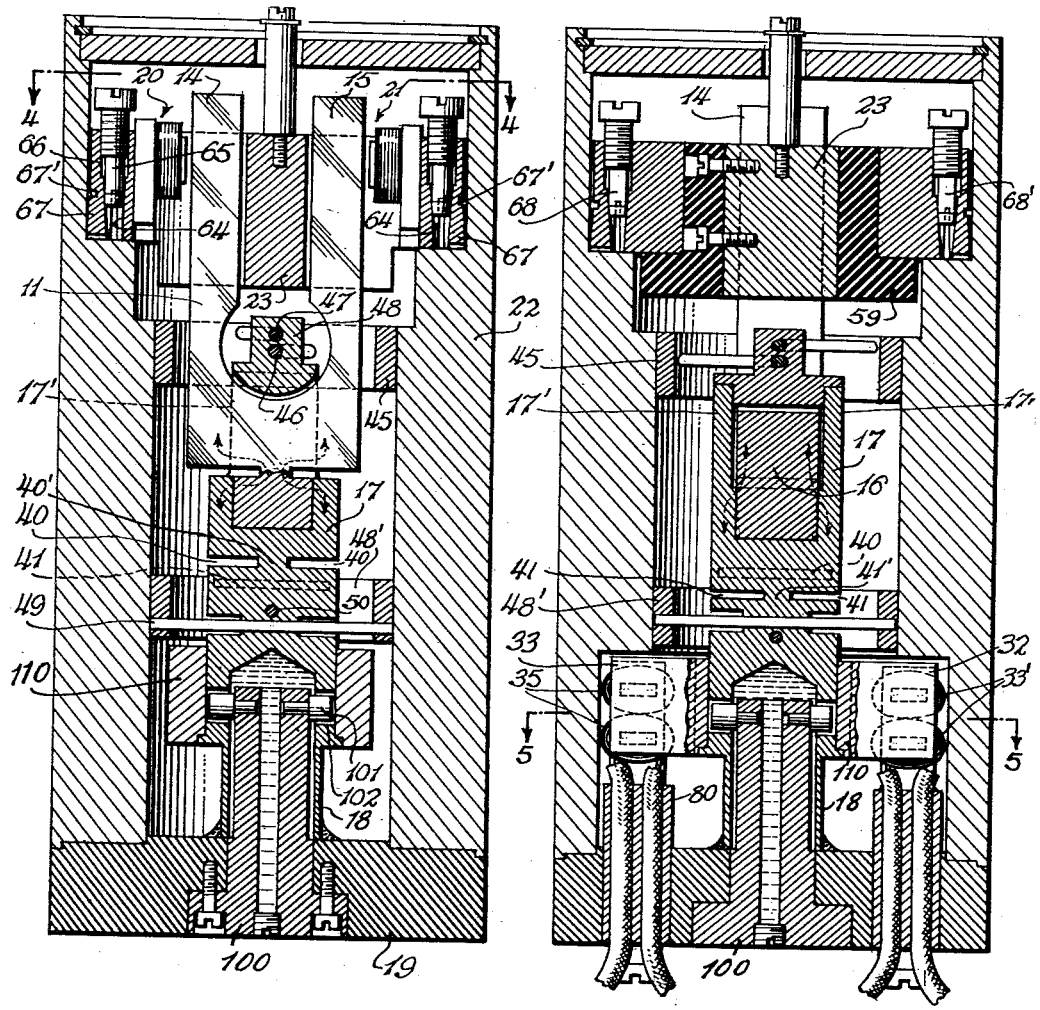
Fig. 2 is a vertical section of the apparatus taken along a plane coincident with the normal plane of vibration of the tines.
Fig. 3 is a vertical sectional view of the apparatus taken in a plane at right angles to the normal plane of vibration of the tines.

Referring now to Fig. 1, the apparatus consists generally of a tuning fork element 11 having substantially massive tines 14 and 15 mounted so that the tines will normally vibrate in a plane defined by the axes XX', YY'. The heel portion 16 of the fork is rigidly secured to the top of an intermediate portion or torsion structure 17 at the bottom of which is secured, or formed integrally therewith, a relatively thin cylindrical torsion spring 18, which, in turn, is secured rigidly to a base 19 mounted on a craft or body, the rate of turn of which is to be measured. The torsion structure 17 is preferably constructed of non magnetic material for the purpose of minimizing stray field coupling between the tine drive field and the torsion pickup. Adjacent the top or open ends of tines 14 and 15 is a driving means which in the embodiment illustrated may take the form of electromagnetic drive coils 20, 21 adjustably secured to the sidewalls 22 of the apparatus (see Fig. 2). Between the open ends of tines 14 and 15, there is provided a vibration pickup device 23 which may be of the variable capacitance type. Drive coils 20 and 21 are connected in series and receive their driving energy from the output of a drive and reference amplifier 24. One input of amplifier 24 is connected with a power supply unit 25 and the other input is connected with capacity pickup 23. The pickup 23 excites the amplifier so that the whole system, fork and amplifier, is self-resonant at a frequency preferably corresponding to the natural frequency of vibration of tuning fork 11. The output of the drive amplifier may be limited so that the amplitude of the drive voltage will not build up to destructive values.

As explained in the above-mentioned Lyman patent, as the tines 14 and 15 are rapidly vibrated in the plane defined by the axes XX', YY', and base 19 is rotated about the YY' axis, tuning fork 11 can preserve angular momentum only by executing a torsional vibration about the YY' axis proportional to the rate of the turning movement of base 19. The magnitude and phase of this torsional vibration are expressed electrically by torsion pick-offs, generally indicated at 30 and 31, and are a measure of the magnitude and direction, respectively, of the rate of turn of base 19 or craft on which the base is mounted. The signal from the pick-offs in the illustrated embodiment of the present invention is supplied to one input of rate signal amplifier 37, also connected with power supply unit 25. The output of rate signal amplifier 37 is applied to a phase-sensitive detector 38 in which it is compared with the reference signal from the drive and reference amplifier 24 to thereby obtain a resultant signal of phase and magnitude proportional to the rate of turn of the base member 19. This resultant signal may be connected to a suitable indicating device or meter 39 calibrated to represent a measure of the rate of turn of base 19. The embodiment of the present invention herein illustrated is primarily suited to telemetering applications. However, it should be noted that in some applications of the invention, it may be desirable to use the output signals from the rate signal amplifier to actuate an induction motor, a phase detector, or other converting device in some portion of the system in which the apparatus is applied.

In accordance with the present invention we have provided an apparatus responsive to turning movements of a base or craft upon which the apparatus is mounted which has extreme ruggedness and long-term stability. For perfect stability, i. e., no drift in the absence of turning movements, it is theoretically sufficient to have the torsional supports of the tuning fork completely free from all vibration at fork frequency except that due to rate of turn. In practice, however, it is extremely difficult, if not impossible, to isolate the tuning fork supports completely from all undesired vibrations. However, in the apparatus of the present invention, we have reduced these undesired spurious vibrations to an absolute minimum and we have provided means for compensating for the effect of such spurious vibrations in the final rate of turn signal thereby providing a rate of turn detecting and measuring apparatus having an exceptionally low drift rate.

In apparatus of this character one of the major causes of spurious or undesired vibrations arises from mass unbalance in the vibrating tuning fork tines. These undesired vibrations may produce directly or indirectly spurious torsional vibrations about the sensitive axis or axis of symmetry YY'. The primary spurious vibrations caused by mass unbalance in the tines may be summarized as follows, reference being made to Fig. 3: a rocking or translational vibration parallel to the tine motion, i. e., in the plane defined by the axes XX', YY' caused by the mass unbalance illustrated in Fig. 8A, one directly produced torsional vibration about the axis of symmetry YY' caused by the mass unbalance illustrated in Fig. 8B, and a vibration along or parallel to the axis of symmetry, i. e., axis YY', and caused by the mass unbalance illustrated in Fig. 8C.

The latter vibration, i. e., vibration along or parallel to the axis YY' is caused by the mass unbalance in the tines coincident with the plane XX', YY', but to the inside or outside of the tine axes C', as illustrated, which are transmitted to the output pick-offs 30 and 31 by mechanical stresses within the finite coupling between the tuning fork and its support. We have minimized or reduced substantially to zero this axial vibration by removing a calculated amount of metal from the fork as carefully as possible at the points illustrated in Fig. 8C, and by the mechanical construction described below. Since it is impossible to support the tuning fork 11 on a point which would in fact be nodal, we have reduced the size of the coupling to a minimum. However, vibration of the tines 14 and 15 produces stresses at the heel 16 of the tuning fork which stresses are transmitted through the finite connection or nodal coupling between heel 16 and the top of torsion structure 17, as indicated by the double ended arrows in Fig. 2. Similar stresses will be produced in torsion structure 17 in the plane at right angles to that of the above-mentioned stresses. These stresses are indicated by the double ended arrows in Fig. 3 of the drawings. Both of these stresses, if not eliminated or greatly reduced, may cause errors in the output signal because of possible coupling into torsional vibrations which, like the effect of a rate of turn, can generate signals in the torsion pick-offs. We have eliminated or reduced substantially to zero these axial vibrations by providing two pairs of slots 40 and 41 cut in the torsion structure 17 in horizontal planes one above the other. These slots extend inwardly from opposite sides of the torsion structure 17 and form two substantially narrow, elongated connecting webs 40' and 41' in torsion structure 17. These webs extend diametrically across the torsion structure 17 at right angles to each other in the planes respectively defined by the axes ZZ', YY' and XX', YY'. Webs 40 and 41 provide isolating means for substantially preventing the above-described spurious axial vibrations from reaching the torsion spring 18 and hence the pick-offs 30 and 31.

Figure 8:
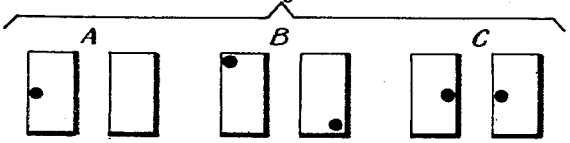
Fig. 8 is a schematic view showing the ends of the tuning fork of the apparatus in three conditions of mass unbalance.

The parallel rocking or translational vibration in the plane XX', YY' may be caused by either the mass unbalance of Fig. 8A or by vibrations external of the apparatus. This lateral and rocking vibration may be present because of the reed-like characteristics of the fork 11 and torsion structure 17. In other words, fork 11 and torsion structure 17 together may vibrate like a reed, that is, a vibratory rod or the like secured at one end and unrestrained at the other, having a node in the region of torsion spring 18. In accordance with the present invention we have eliminated or greatly reduced these reed-like vibrations by carefully removing material or mass from the tines at the points illustrated in Fig. 8C and finally by providing lateral or anti-rocking supports generally indicated at 43 and 44. These supports effectively control the lateral rocking resonances by tuning them to frequencies greatly spaced both from low frequency craft vibrations and from the natural resonance of fork 11 so that they will not affect the rate of turn signal at torsion pick-offs 30 and 31. These lateral supports are positioned along the length of the apparatus preferably at the anti-nodal positions of the above-described reed-like vibrations. The upper lateral support 43 comprises a cartwheel-like structure having a rim 45 secured to the rigid housing sidewalls 22 for the apparatus. A plurality of spokes or strut-like elements 46, 47 are fixed to a hub 48 and extend outwardly therefrom and are secured in rim 45. Hub 48 is secured to the top of torsion structure 17 as close as possible to axis YY'.

It will be noted that the upper lateral support is located at a position above the tuning fork heel and is so constructed that it will not touch or affect the heel portion 16 of the tuning fork 11. This is accomplished by providing a pair of prongs 17' extending upwardly from the torsion structure 17. The hub 48, to which the spoke elements 46 and 47 are secured, is soldered between the spaced upper ends of the prongs.

The second lateral support 44 is similar in construction to support 43 and comprises a rim 48' also rigidly secured to the housing sidewalls 22. A plurality of spokes 49 and 50 are secured near the bottom portion of torsion structure 17 as close to axis YY' as possible and extend radially outward therefrom and are secured in rim 48'. This structure permits relative twisting between torsion structure 17 and sidewalls 22 but at the same time will prevent translational or rocking movements therebetween. As above described, these lateral supports about the axis YY' space the lateral vibration resonances, tuning them to frequencies which greatly minimize spurious rocking components of vibration due to external vibrations, or drive unbalance, or mass unbalance in the tines, and hence decrease their effect on the torsion pick-offs. Lateral supports 43 and 44 also provide a rugged support for the apparatus when the same is subjected to severe shocks.

Thus, the lateral supports 43 and 44 together with the torsion spring 18 form a composite torsion spring, spokes 46, 47 and 49, 50 being stiff to lateral translation and the tube or torsion spring 18 being stiff to axial translation. Of course, the composite torsion structure is tuned so that the torsion resonance coincides with the tuning fork natural frequency, whereas the translational resonances do not. It may be desirable, in some applications, and for manufacturing conveniences, to support the entire tuning fork assembly by the lateral supports 43 and 44 alone, eliminating entirely the torsion spring or axial support 18.

Even with the above construction, rocking components of vibration may reach the torsion pick-offs, but they are of very low order and may be substantially compensated for by providing an adjustment of the pick-off coils 33', 34, 35 and 36 relative to the pick-off armatures 32 and 33, to be hereinafter more fully described.

Figure 4:
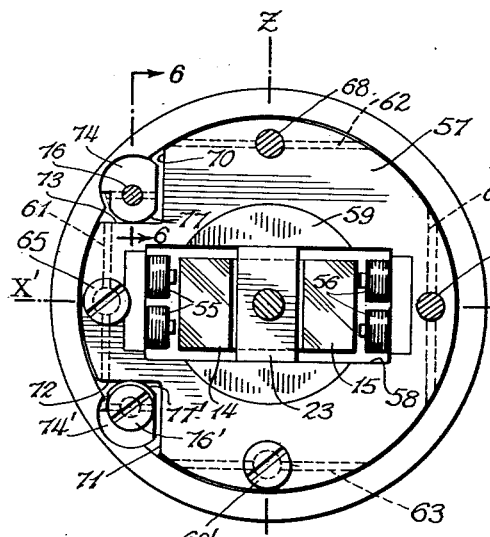
Fig. 4 is a plan view, partially in section, taken along the line of 4—4 of Fig. 2.

In order to drive the tines as near as possible in their natural plane of vibration without coercion, we have provided means for adjusting the electromagnetic drive means 20 and 21. For this purpose we have supported drive coil members 55, 56 in a cylindrical supporting member 57 (see Figs. 2, 3 and 4) which is provided with a central opening 58 adapted to receive the ends of tines 14 and 15. Capacity pickup 23 is positioned in opening 58 so that it lies between the open ends of the tines and is insulated from supporting member 57 by a suitable insulating piece 59. The whole supporting member 57 is adjustable as a unit in directions both laterally and rotationally relative to the axis YY'.

To provide for the adjustment of drive coils 55 and 56 in lateral directions relative to axis YY', we have milled or otherwise formed vertical slots 60, 61, 62 and 63 in supporting member 57, which extend upwardly from the bottom thereof to a position approximately one-half the width thereof. These slots are positioned relatively close to the outside edge of cylindrical support 57 and form chordal segments or outer portions 67 thereof, the outer periphery of which will bear against the wall 22 of the housing. Through the vertical length of each of the slots 60, 61, 62 and 63 and preferably on the axes XX' and YY', respectively, we have drilled a tapered hole 64 into which a conical-ended screw 65 is inserted. A tapped hole 66 provides for moving the conical-ended screw along the length of the tapered hole 64. Thus it will be seen that as the conical-ended screw 65 is raised or lowered in the tapered hole 64, the chordal segment 67 of support member 57 is forced against the housing wall 22. Segment 67 of supporting member 57 is rendered relatively flexible by milling or cutting suitable lateral slots 67' therein to reduce the thickness of the material between member 57 and chordal segment 67. Four of these screw and slot arrangements are provided, two for adjusting the drive coils along the XX' axis and two for adjusting the coils along the ZZ' axis. Therefore, by tightening one screw, say screw 65, and loosening corresponding screw 65', the support member 57 and drive coils 55 and 56 will be moved as a unit along the axis XX'. The exact same arrangement is provided for moving support member 57 along axis ZZ', as by screw 68, 68' in Fig. 3. It will be noted that the adjustments described above may conveniently be made from the end of the housing.

Figure 6:
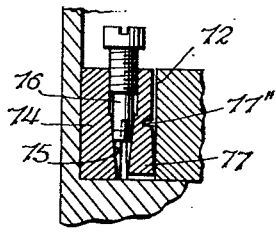
Fig. 6 is a sectional view of a portion of the apparatus taken along line 6—6 of Fig. 4.

Rotational adjustment of the drive coils 55 and 56 about the axis YY' is provided by a similar arrangement. For this purpose we have milled out or cut away the supporting member 57 as at 70 and 71 to provide suitable bearing surfaces 72, 73. A slotted adjusting member 74 is formed integrally with or suitably secured to the housing wall 22 (see Figs. 4 and 6) and has drilled along the length of the slot thereof a tapered hole 75. As above, into this hole is fitted a conical-ended screw 76 which bears against the tapered walls of the hole 75. The slot in member 74 is so positioned that raising or lowering of screw 76 will cause lower portion 77 of member 74 to be forced against the bearing surfaces 73. A similar member 74' is provided adjacent the bearing surface 72 and raising or lowering of screw 76' will cause lower portion 77' to bear against the bearing surface 72. The slotted adjusting members 74, 74' are provided with suitable lateral slots 77'' for reducing the thickness of the material between member 74, 74' and the lower portion 77, 77' thereof to thereby provide reasonable flexibility in lower portions 77, 77'. It will be noted that adjusting members 74, 74' are placed on opposite sides of axis XX' so that by raising one screw and lowering the other screw the supporting member 57 may be rotated about axis YY'. This adjustment is also made from the top of the apparatus.

Figure 5:
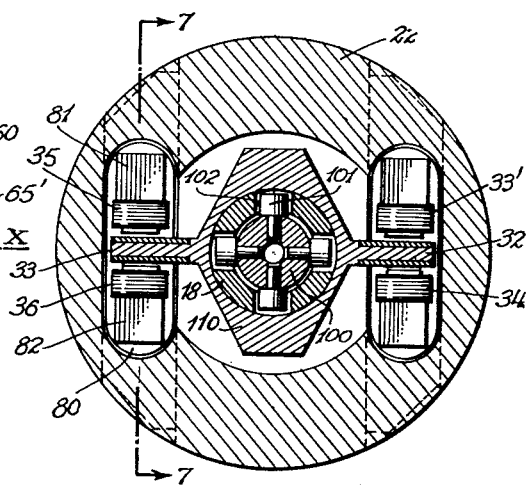
Fig. 5 is a sectional view taken along the line 5—5 of Fig. 3.
Figure 7:
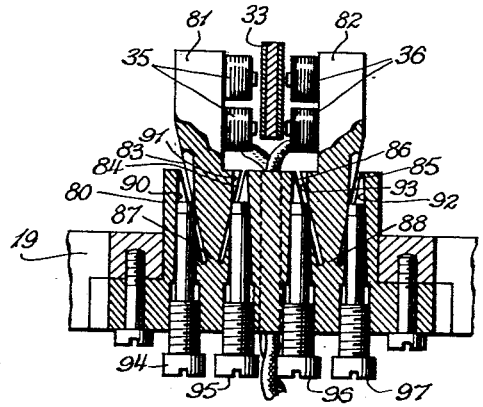
Fig. 7 is a view partially in section of another portion of the apparatus taken along the line 7—7 of Fig. 5.

Even after careful adjustment of the drive coils 55, 56 and the provision of the lateral supports and isolation means, spurious vibrations may still reach the pick-offs 30 and 31 and affect the rate of turn signal. Spurious lateral vibrations may be effectively cancelled by adjusting the position of the pick-off coils 33, 34, 35 and 36 relative to the vanes 32 and 33. This adjustment is accomplished in a similar manner as the adjustment of drive coils 55, 56. Since the adjustment of the pairs of drive coils 33 and 34, and 35 and 36 are identical, only the adjusting structure of one set, 35 and 36, will be described in detail, reference being made particularly to Figs. 5 and 7. The vanes 32 and 33 preferably extend radially from a hexagonal or suitably shaped member 110 having a bore extending centrally therethrough and a peripheral recess in the side walls of said bore at the lower end thereof forming a shoulder. The upper end of the bore is adapted to receive the lower end of member 17 while the flanged upper end of the cylindrical torsion spring 18 is adapted to fit within the bore of member 110 and within the peripheral recess at the lower end thereof. Both the member 17 and the flanged upper end of torsion spring 18 are securely affixed to the member 110 as, for example, by means of brazing or welding. Secured to base 19 is a support 80 having upstanding portions 81, 82 on which are mounted pick-off coils 35 and 36. Support 80 is positioned on base member 19 so that upstanding portions 81 and 82 thereof and coils 35 and 36 lie closely adjacent to opposite faces of the vane 33. For providing movement of coils 35 and 36 towards and away from the opposite faces of the vane 33, we have provided a plurality of slots 83, 84, 85 and 86. These slots 83 and 84 in support 80 extend from opposite sides of upstanding portions 81 and at an angle towards each other to form a relatively resilient coupling 87 between upstanding portion 81 and the support 80. Similarly, slots 85 and 86 extend downwardly from each side of upstanding portion 82 at an angle towards each other, so that a relatively resilient coupling 88 is provided between upstanding portion 82 and the support 80. Tapered holes 90, 91, 92 and 93 are drilled substantially along the length of slots 83, 84, 85 and 86, respectively, and conical-ended screws 94, 95, 96 and 97 are inserted in the respective tapered holes. Thus, to move coils 35, for example, towards the face of the vane 33, screw 94 may be raised in tapered hole 90 and simultaneously screw 95 may be lowered in the corresponding tapered hole 91 thus forcing upstanding portion 81 and associated coils 35 to pivot about the resilient coupling 87. Coils 36 may be similarly adjusted relative to the opposite face of vane 33 through respectively raising and lowering of screws 96 and 97. As in the case of the tine drive assembly adjustment, the torsion pickup coils may be similarly adjusted from the ends of the apparatus so that the supporting structure and the entire sensitive apparatus is not disturbed. It is also important to note that the adjustments are entirely within either the tine drive assembly or the torsion pick-off assembly and in no way affect any of the other elements of the apparatus.

It is important, that upon completion or termination of an applied rate of turn, torsional vibration caused thereby should be brought to a stop in as short a time as possible and at a predetermined rate. For this purpose we have provided a damping means which, in the embodiment illustrated, comprises a metal core 100 secured to base 19 of such a size that it will substantially completely fill the cylindrical opening formed by the cylindrical torsion spring 18, leaving only a very thin space between the walls of core 100 and the inside periphery of spring 18. Positioned at the top of core 100 is a plurality of radially extending rods 101 which extend into holes 102 in the lower portion of the torsion structure 17. The clearance between these rods and holes is extremely small, say, for example, of the order of five thousandths of an inch. This small space, and the space between core 100 and spring 18, is filled with a suitable viscous fluid, such as, for example, a low viscosity Silicone oil. See particularly Figs. 2, 3 and 5. Thus, in the presence of a torsional vibration the Silicone fluid surrounding the rods 101 is squeezed or forced with turbulence about the walls of the holes 102. Such a construction provides adequate damping of the torsional vibration to make it decay at an appropriate rate upon termination of an applied rate of turn.

While we have described our invention in its preferred embodiment, it is to be understood that the words which we have used are words of description rather than of limitation and that changes within the purview of the appended claims may be made without departing from the true scope and spirit of our invention in its broader aspects.

What is claimed is:

1. Apparatus for measuring the angular rate of turn of a craft about an axis comprising a housing having substantially rigid side walls and a base, a tuning fork having a heel portion and a pair of tines integral therewith and mounted within said housing to vibrate in a plane including said axis, a first vibration-damping supporting means for said fork comprising a somewhat elongated mass to one end of which the heel of said fork is secured, means connected to said first supporting means adjacent its other end for detecting torsional vibrations thereof and for providing a signal output proportional thereto, and laterally extending second supporting means for said first supporting means connected to said first supporting means and the housing side walls.

2. In a device for measuring turning movements of a craft about an axis, a tuning fork mounted to vibrate in a plane including said axis and having a heel portion and a pair of tines integral therewith, the vibration of said tines in said plane producing a torsional vibration about said axis upon turning movements thereof about said axis, a base member, and an intermediate portion connecting said fork with said base member, means forming a nodal coupling between said heel portion and said intermediate portion, a torsion spring resiliently coupling said intermediate portion with said base member for providing relative torsional movement between said base member and said fork, means for isolating said torsion spring from vibratory stresses paralleling said axis due to deformation stresses in the tuning fork heel portion resulting from said tine vibration and transmitted to said intermediate portion by said nodal coupling, said isolating means comprising a pair of slots extending inwardly from opposite sides of said intermediate portion to define a substantially narrow, elongated connecting web extending diametrically across said intermediate portion, and lying in a plane including said axis.

3. In a device for measuring turning movements of a craft about an axis, a tuning fork mounted to vibrate in a plane including said axis and having a heel portion and a pair of tines integral therewith, the vibration of said tines in said plane producing a torsional vibration about said axis upon turning movements thereof about said axis, a base member, and an intermediate portion connecting said fork with said base member, means forming a nodal coupling between said heel portion and said intermediate portion, a torsion spring resiliently coupling said intermediate portion with said base member for providing relative torsional movement between said base member and said fork means for isolating said torsion spring from vibratory stresses paralleling said axis due to deformation stresses in the tuning fork heel portion resulting from said tine vibration and transmitted to said intermediate portion by said nodal coupling, said isolating means comprising a first pair of slots extending inwardly from opposite sides of said intermediate portion to define a first substantially narrow, elongated connecting web extending diametrically across said intermediate portion, and a second pair of slots also extending inwardly from opposite sides of said intermediate portion to define a second, substantially narrow, elongated connecting web extending diametrically across said intermediate portion, said webs being angularly disposed relative to each other in said intermediate portion.

4. In a device for measuring the rate of turning movements of a craft about an axis, a tuning fork mounted to vibrate in a plane including said axis and having a heel portion and a pair of tines integral therewith, the vibration of said tines in said plane producing a torsional vibration about said axis upon turning movements thereof about said axis, a base member, an intermediate portion connecting said fork with said base member, means forming a nodal coupling between said heel portion and said intermediate portion, a torsion spring resiliently coupling said intermediate portion with said base member for providing relative torsional movement between said base member and said fork, means for isolating said torsion spring from vibratory stresses paralleling said axis due to deformation stresses in the tuning fork heel portion resulting from said tine vibration and transmitted to said intermediate portion by said nodal coupling, said isolating means comprising, a first pair of slots extending inwardly from opposite sides of said intermediate portion to define a first substantially, narrow, elongated connecting web extending diametrically across said intermediate portion in a plane substantially parallel to the plane of vibration of said tines, and a second pair of slots also extending inwardly from opposite sides of said intermediate portion to define a second substantially narrow, elongated connecting web extending diametrically across said intermediate portion in a plane substantially at right angles to the plane of vibration of said tines.

5. In a device for measuring the rate of turning movements of a craft about an axis, a tuning fork mounted to vibrate in a plane including said axis and having a heel portion and a pair of tines integral therewith, the vibration of said tines in said plane producing a torsional vibration about said axis proportional to the magnitude and direction of turning movements thereof about said axis, a base member, and an intermediate portion connecting said fork with said base, means forming a nodal coupling between said heel portion and said intermediate portion, a torsion spring resiliently coupling said intermediate portion with said base member for providing relative torsional movement between said base member and said fork, means for isolating said torsion spring from vibrations parallel to said axis due to deformation stresses in the tuning fork heel portion resulting from said tine vibration and transmitted to said intermediate portion by said nodal coupling, said isolating means comprising a first pair of slots extending inwardly from opposite sides of said intermediate portion in a plane normal to said axis to define a first substantially narrow, elongated connecting web extending diametrically across said intermediate portion in a plane parallel to the plane of vibration of said tines, and a second pair of slots also extending inwardly from opposite sides of said intermediate portion in a plane normal to said axis to define a second substantially narrow, elongated connecting web extending across said intermediate portion in a plane at right angles to the plane of vibration of said tines.

6. Apparatus responsive to the rate of turn of a craft about an axis, a housing having substantially rigid sidewalls and a base, a tuning fork having a heel portion and a pair of tines integral therewith and mounted to vibrate in a plane including said axis, a vibration-damping mass to which the heel of said fork is secured, resilient torsional constraining means connecting said mass to said base while permitting angular positional variations about said axis between said fork and said base, said fork and mass being capable of vibrations laterally of said axis generated by unsymmetrically balanced masses in said tines, means responsive to the angular positional variations of said mass for detecting rotation of said base, and a plurality of laterally extending coupling rods connected to said mass and to said housing sidewalls for altering the natural frequency of said lateral vibrations to frequencies different from the frequency of vibration of said tines, whereby said detecting means will be substantially unaffected by lateral vibrations of frequencies in the region of said tine frequency.

7. Apparatus responsive to the rate of turn of a craft about an axis, a housing having substantially rigid sidewalls and a base, a tuning fork having a heel portion and a pair of tines integral therewith and mounted in said housing means including a reference current source for driving the tines thereof alternately, rapidly, and continuously toward each other and away from each other in a plane including said axis and at a frequency corresponding to the natural frequency of vibration of said fork and said reference current source whereby a torsional vibration about said axis proportional to the direction and magnitude of turning movements of the craft about said axis is generated, a vibration-damping mass to which the heel of said fork is secured, a resilient connection connecting said mass with said base member to permit torsional vibration of said mass, vibration-responsive signal generating means coupled with said resilient connection and said base adapted to provide an output signal depending upon the amplitude and phase sense of said torsional vibration relative to the phase of said reference current source, laterally-extending coupling means between said intermediate portion and said housing sidewalls for isolating said signal generating means from lateral vibrations of said fork and intermediate portion produced by externally caused lateral vibrations of said housing, whereby said output signal will be unaffected by said external vibrations.

8. Apparatus responsive to the rate of turn of a craft about an axis, a housing having substantially rigid sidewalls and a base, a tuning fork having a heel portion and a pair of tines integral therewith and mounted in said housing means including a reference current source for driving the tines thereof alternately, rapidly, and continuously toward each other and away from each other in a plane including said axis at a frequency of vibration corresponding to the natural frequency of vibration of said fork and said reference current source, whereby a torsional vibration about said axis proportional to the direction and magnitude of turning movements of the craft about said axis is generated, a torsion spring having one end thereof secured to said base member, an intermediate vibration-damping portion comprising a mass connected at one end to the heel of said fork and at the other end to said torsion spring, said torsion spring and intermediate coupling being capable of reed-like vibrations laterally of said axis having a node in the region of said torsion spring, means for altering the natural frequency of said reed-like vibrations in the region of said tine frequency to frequencies different from the said tine frequency, a pair of lateral supports, one at the lower end of said intermediate portion and in the region of an antinode of one mode of said reed-like vibration and the other at the upper end thereof in the region of an antinode of another mode of said reed-like vibration, each of said supports comprising a plurality of angularly-disposed, rod-like elements each having one end thereof fixed on said intermediate portion and the other end thereof extending radially outwardly from said intermediate portion and secured in said rigid sidewalls, whereby said fork and intermediate portion are resiliently supported in torsion about said axis but are substantially rigidly supported against lateral movements thereof relative to said axis.

9. In a device for measuring the rate of turning movements of a craft about an axis, a housing, a support fitted within said housing to engage opposite sides thereof, a tuning fork having a pair of resiliently connected tines mounted for vibration in a plane including said axis, drive means secured to said support for vibrating said tines alternately towards each other and away from each other, slots in opposite sides of said support in part separating the central portion thereof from the housing-engaging peripheral portions, and screw threaded wedges paralleling said axis and disposed respectively in the zones of said slots for urging the portions of said support apart, whereby said drive means may be adjusted to produce driving forces on said tines providing vibration thereof in a substantially purely planar manner.

10. In a device for measuring the rate of turning movements of a craft about an axis, a housing, a support fitted within said housing to engage opposite sides thereof, a tuning fork having a pair of resiliently connected tines mounted for vibration in a plane including said axis, drive means secured to said support for vibrating said tines alternately towards each other and away from each other, said support having spaced surfaces extending inwardly from the periphery thereof, bosses extending from said housing into engagement respectively with said surfaces, said bosses being slotted in a direction generally paralleling said surfaces, and screw threaded wedges paralleling said axis and disposed in the zones of the slots of said bosses, said bosses being so constructed and arranged as to urge said support in a rotational manner about said axis in either direction when said wedges are operated, whereby said drive means may be adjusted to produce driving forces on said tines providing vibration thereof in a substantially purely planar manner.

11. In a device for measuring the rate of turning movements of a craft about an axis, a housing having substantially rigid sidewalls, a tuning fork having a pair of resiliently connected tines mounted for vibration in a plane including said axis, a support member fitted within said housing to engage opposite sidewalls thereof and adjacent the open ends of said fork, electromagnetic drive means for vibrating said tines alternately towards each other and away from each other fixedly mounted on said support member, slots in opposite sides of said support member and extending in substantially mutually perpendicular relation to separate in part the central portion of said support member from the housing engaging peripheral portions thereof, a tapered opening passing through said support member and communicating with each slot, and screw threaded wedges disposed within said tapered openings for urging the portions of said support member apart, whereby said drive means may be adjusted to produce driving forces on said tines providing vibration thereof in a purely planar manner.

12. A device for detecting the rate of turning movements of a craft about an axis, a base member, a tuning fork having elastically interconnected tines, means including a reference current source for driving the tines alternately, rapidly, and continuously towards each other and away from each other in a plane including said axis whereby a torsional vibration about said axis proportional to the direction and magnitude of turning movements of said craft is generated, a torsion member having one end thereof fixed to said base member and the other end fixed to said fork, said torsion member resiliently coupling said fork with said base member for providing relative torsional movement therebetween, vibration-responsive means for detecting the magnitude and direction of said torsional vibration dependent upon the amplitude and phase of said torsional vibration relative to the phase of said reference current source, said last-mentioned means including a pick-off comprising a vane fixed to said torsion member for torsional movement therewith and a plurality of magnetic coils on both sides of said vane and adjustably secured to said base, and means for adjusting the spacings of said magnetic coils relative to said vane, whereby to compensate for spurious torsional vibrations which may be generated by spurious vibrations of said tines.

13. A device for detecting the rate of turning movements of a craft about an axis, a base member, a tuning fork having elastically interconnected tines, means including a reference current source for driving said tines, alternately, rapidly, and continuously towards each other and away from each other in a plane including said axis whereby a torsional vibration about said axis proportional to the direction and magnitude of turning movements of said craft is generated, a torsion member having one end thereof fixed to said base member and the other end thereof fixed to said fork, said torsion spring resiliently coupling said fork and said base for providing relative torsional movements therebetween, electromagnetic pick-off means for detecting the magnitude and direction of said torsional vibration dependent upon the amplitude and phase of said torsional vibration relative to the phase of said reference current source, said pick-off means comprising an armature member mounted on said torsion member and a field member comprising a plurality of magnetic coils adjustably mounted on said base member adjacent and to both sides of said armature member, and means for separately adjusting the spacings of said magnetic coils relative to said armature member, whereby to be rendered unresponsive to spurious vibrations which may be generated by spurious vibrations of said tines.

14. A device for detecting the rate of turning movements of a craft about an axis, a base member, a turning fork having elastically interconnected tines, means including a reference current source for driving said tines alternately, rapidly, and continuously towards each other and away from each other in a plane including said axis whereby a torsional vibration about said axis proportional to the direction and magnitude of turning movements of said craft is generated, a torsion spring having one end thereof fixed to said base member, an intermediate portion connecting said fork with the other end of said torsion spring, said torsion spring resiliently coupling said fork and intermediate portion with said base member for providing relative torsional movement therebetween, electromagnetic pick-off means for detecting the magnitude and direction of said torsional vibration dependent upon the amplitude and phase of said torsional vibration relative to the phase of said reference current source, said last-mentioned means comprising a pair of vanes secured to said intermediate portion for torsional movement therewith, said vanes extending outwardly on opposite sides of said intermediate portion in a common plane including said axis and forming the armatures of said electromagnetic pick-offs, and first and second pairs of field members respectively positioned closely adjacent opposite faces of each of said vanes and secured to said base member, said field members being so electrically interconnected that signals generated therein will be additive upon torsional movements of said vanes about said axis but will cancel upon translational movements thereof, and means for separately adjusting the spacings of the field members on opposite sides of one of said vanes whereby to render said pick-off substantially unresponsive to spurious vibrations.

15. A device for detecting the rate of turning movements of a craft about an axis, a base member, a tuning fork having elastically interconnected tines, means including a reference current source for driving said tines alternately, rapidly, and continuously towards each other and away from each other in a plane including said axis whereby a torsional vibration about said axis proportional to the direction and magnitude of turning movements of said craft is generated, a torsion spring having one end thereof fixed to said base member, an intermediate portion connecting said fork with the other end of said torsion spring, said torsion spring resiliently coupling said fork and intermediate portion with said base member for providing relative torsional movement therebetween, electromagnetic pick-off means for detecting the magnitude and direction of said torsional vibration dependent upon the amplitude and phase of said torsional vibration relative to the phase of said reference current source, said last-mentioned means comprising a pair of vanes secured to said intermediate portion for torsional movement therewith, said vanes extending outwardly on opposite sides of said intermediate portion in a common plane including said axis and forming the armatures of said electromagnetic pick-offs, first and second pairs of field members respectively positioned closely adjacent opposite faces of each of said vanes and adjustably secured to said base member, the field members lying adjacent diametrically opposite faces of said vanes being electrically interconnected, whereby the signals generated therein will be additive with torsional movement of said vanes about said axis but will cancel upon translational movements thereof, and means for individually adjusting said pairs of field members relative to said vanes in directions substantially perpendicular to the faces of said vanes, whereby said pickup means may be adjusted to be unresponsive to spurious vibrations which may be generated by spurious vibrations of said tines.

16. Apparatus responsive to the rate of turn of a craft about an axis, a housing having substantially rigid sidewalls, a tuning fork mounted to vibrate in a plane including said axis, resilient torsional constraining means connecting said fork to said housing for permitting angular positional variations about said axis between said fork and said housing according to variations of torsion in said resilient means, said last-mentioned means comprising a plurality of angularly disposed, rod-like elements each having one end thereof affixed to said constraining means in a central zone thereof but otherwise passing freely therethrough and the other end thereof extending radially outwardly from said constraining means and being secured in said rigid sidewalls, whereby said fork assembly is resiliently supported in torsion about said axis but is substantially rigidly supported against lateral movements thereof relative to said axis.

17. Apparatus responsive to the rate of turn of a craft about an axis, a tuning fork mounted to vibrate in a plane including said axis, resilient torsional constraining means connecting said fork to said base for permitting relative angular positional variations about said axis between said fork and said base according to variations of torsion in said resilient connecting means, said fork and resilient constraining means being capable of spurious torsional vibrations about said axis generated by unsymmetrically balanced masses in said tines, said resilient torsional constraining means comprising a tubular member connected at one end with said fork and at the other end to said base and having such dimensions that any spurious resonances excited therein by said spurious vibrations are different from the resonant frequency of torsional vibration produced by rotation of said base relative to said tuning fork.

18. Apparatus responsive to the rate of turn of a craft about an axis, a base member, a tuning fork mounted to vibrate in a plane including said axis, a substantially thin tubular member connected with said fork and to said base member for permitting angular positional variations about said axis between said fork and said base member according to variations of torsion in said tubular member, said tubular member being provided with a recess in a side wall thereof, damping means between said base member and said tubular member comprising a rod having one end thereof fixed to said base member and extending within said recess in said tubular member, the dimensions of said tubular member and rod being such as to define a substantially thin space between the walls of the recess in said tubular member and said rod surface, and a viscous fluid filling said space having high viscosity such that torsional vibrations produced by turning movements of said craft about said axis may be reduced to zero at a predetermined rate upon termination of said turning movements.

References Cited in the file of this patent

UNITED STATES PATENTS

| Number | Name | Date |
|---|---|---|
| 2,309,853 | Lyman et al. | Feb. 2, 1943 |
| 2,385,005 | Langer | Sept. 18, 1945 |
| 2,440,605 | Hathaway | Apr. 27, 1948 |
| 2,455,939 | Meredith | Dec. 14, 1948 |
| 2,513,340 | Lyman | July 4, 1950 |